(12) United States Patent
Yulizar et al.

(10) Patent No.: US 9,798,623 B2
(45) Date of Patent: Oct. 24, 2017

(54) USING CACHE TO MANAGE ERRORS IN PRIMARY STORAGE

(75) Inventors: Yunaldi Yulizar, Shakopee, MN (US); Luke W. Friendshuh, Elko, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 604 days.

(21) Appl. No.: 13/469,801

(22) Filed: May 11, 2012

(65) Prior Publication Data

US 2013/0305086 A1    Nov. 14, 2013

(51) Int. Cl.
| | | |
|---|---|---|
| *G06F 11/00* | (2006.01) | |
| *G06F 11/14* | (2006.01) | |
| *G11B 20/10* | (2006.01) | |
| *G11B 20/18* | (2006.01) | |

(52) U.S. Cl.
CPC .... *G06F 11/1415* (2013.01); *G11B 20/10527* (2013.01); *G11B 20/18* (2013.01)

(58) Field of Classification Search
CPC ............. G06F 12/0866; G06F 11/2094; G06F 11/1666; G06F 3/0619; G06F 11/1471; G06F 12/0871; G06F 11/14; G06F 2211/1009; G06F 11/2056; G06F 12/0868; G06F 12/0888; G06F 2212/2022; G06F 11/0793; G06F 12/0802; G06F 2212/286; G06F 11/1064; G06F 12/0815
USPC .................................................. 714/6.1; 3/6.1
See application file for complete search history.

(56) References Cited

U.S. PATENT DOCUMENTS

| | | | | |
|---|---|---|---|---|
| 4,875,155 A | * | 10/1989 | Iskiyan ............... | G06F 12/0804 711/113 |
| 4,972,316 A | * | 11/1990 | Dixon et al. ................... | 711/113 |
| 5,584,007 A | * | 12/1996 | Ballard ............... | G06F 12/0866 711/113 |
| 5,588,129 A | | 12/1996 | Ballard | |
| 5,682,527 A | * | 10/1997 | Cooper et al. | |
| 6,173,377 B1 | * | 1/2001 | Yanai .................... | G06F 3/0601 711/154 |
| 6,195,761 B1 | * | 2/2001 | Kedem ............... | G06F 11/1076 711/114 |
| 6,275,953 B1 | * | 8/2001 | Vahalia et al. ................... | 714/11 |
| 6,513,097 B1 | * | 1/2003 | Beardsley ........... | G06F 11/0724 711/113 |
| 6,519,730 B1 | * | 2/2003 | Ando ................... | G06F 11/1407 714/746 |
| 7,032,123 B2 | | 4/2006 | Kane et al. | |
| 7,243,190 B2 | * | 7/2007 | Ash ...................... | G06F 11/2089 711/113 |
| 7,444,541 B2 | * | 10/2008 | Lubbers .............. | G06F 11/2092 714/5.11 |

(Continued)

FOREIGN PATENT DOCUMENTS

WO    WO2011/101917    8/2011

*Primary Examiner* — Loan L. T. Truong
(74) *Attorney, Agent, or Firm* — Hollingsworth Davis, LLC (57) ABSTRACT

An occurrence of at least one storage error is determined in an addressable portion of a primary storage storing a block of data. In response to determining the occurrence of the at least one storage error, it is determined whether the block of data is available in cache storage. In response to determining the block of data is cached, the cached block of data is used rather than the block of data from the addressable portion of the primary storage.

21 Claims, 5 Drawing Sheets

(56) References Cited

U.S. PATENT DOCUMENTS

| | | | | |
|---|---|---|---|---|
| 7,558,913 B2* | 7/2009 | Panabaker | G06F 12/0868 | |
| | | | 711/113 | |
| 7,734,949 B2 | 6/2010 | Koktan et al. | | |
| 7,966,450 B2 | 6/2011 | Klein | | |
| 7,975,169 B2* | 7/2011 | Ash | G06F 11/1441 | |
| | | | 714/6.2 | |
| 8,489,820 B1* | 7/2013 | Ellard | 711/138 | |
| 8,549,226 B2* | 10/2013 | Ari | G06F 12/0888 | |
| | | | 711/117 | |
| 8,589,724 B2* | 11/2013 | Gaertner et al. | 714/6.22 | |
| 8,595,442 B1* | 11/2013 | James-Roxby et al. | 711/131 | |
| 8,713,261 B1* | 4/2014 | Aharoni | G06F 12/0868 | |
| | | | 711/137 | |
| 9,239,797 B2* | 1/2016 | Galbraith | G06F 12/0888 | |
| 9,588,857 B2* | 3/2017 | Louie | G06F 11/2094 | |
| 2003/0028819 A1* | 2/2003 | Chiu | G06F 11/2089 | |
| | | | 714/5.11 | |
| 2003/0037207 A1* | 2/2003 | Aigo | G06F 12/0866 | |
| | | | 711/144 | |
| 2004/0153727 A1* | 8/2004 | Hicken et al. | 714/6 | |
| 2005/0240854 A1* | 10/2005 | Nakagawa et al. | 714/758 | |
| 2006/0101216 A1* | 5/2006 | Kobayashi et al. | 711/162 | |
| 2006/0143407 A1* | 6/2006 | Humlicek | 711/143 | |
| 2006/0212644 A1* | 9/2006 | Acton | G06F 1/30 | |
| | | | 711/103 | |
| 2006/0224849 A1* | 10/2006 | Rezaul Islam | G06F 11/1666 | |
| | | | 711/170 | |
| 2006/0227585 A1* | 10/2006 | Tomoda | 365/36 | |
| 2007/0220313 A1* | 9/2007 | Katsuragi et al. | 714/6 | |
| 2007/0233947 A1* | 10/2007 | Coulson | G06F 12/0804 | |
| | | | 711/113 | |
| 2008/0034155 A1* | 2/2008 | Koga et al. | 711/114 | |
| 2008/0091893 A1* | 4/2008 | Durica et al. | 711/161 | |
| 2008/0307287 A1* | 12/2008 | Crowell | G06F 11/2736 | |
| | | | 714/758 | |
| 2009/0172324 A1* | 7/2009 | Han et al. | 711/162 | |
| 2011/0191563 A1* | 8/2011 | Acedo | G06F 3/0605 | |
| | | | 711/166 | |
| 2011/0197036 A1* | 8/2011 | Ishii | 711/155 | |
| 2011/0208998 A1 | 8/2011 | Hosaka | | |
| 2011/0219167 A1 | 9/2011 | Klein | | |
| 2011/0271041 A1 | 11/2011 | Lee et al. | | |
| 2012/0210188 A1* | 8/2012 | Fee | G06F 11/1064 | |
| | | | 714/752 | |
| 2013/0054869 A1* | 2/2013 | Tolia et al. | 711/102 | |
| 2013/0173955 A1* | 7/2013 | Hallak et al. | 714/6.24 | |
| 2013/0275391 A1* | 10/2013 | Batwara | G06F 17/30085 | |
| | | | 707/689 | |
| 2014/0013027 A1* | 1/2014 | Jannyavula Venkata | G06F 12/0866 | |
| | | | 711/103 | |
| 2014/0219001 A1* | 8/2014 | Patapoutian | G11C 13/0002 | |
| | | | 365/148 | |
| 2015/0046747 A1* | 2/2015 | Gaertner | G06F 11/1666 | |
| | | | 714/6.11 | |
| 2015/0193302 A1* | 7/2015 | Hyun | G11C 29/52 | |
| | | | 714/764 | |
| 2016/0239205 A1* | 8/2016 | Rothberg | G06F 3/064 | |
| 2016/0342465 A1* | 11/2016 | Cudak | G06F 11/1068 | |

\* cited by examiner

USING CACHE TO MANAGE ERRORS IN PRIMARY STORAGE

SUMMARY

The present disclosure is related to systems, methods, apparatuses, and computer readable medium for using cache to manage errors in primary storage. In one embodiment, an occurrence of at least one storage error is determined in an addressable portion of a primary storage storing a block of data. In response to determining the occurrence of the at least one storage error, it is determined whether the block of data is available in cache storage. In response to determining the block of data is cached, the cached block of data is used rather than the block of data from the addressable portion of the primary storage.

In another embodiment, a cached block of data is caused to be stored in a cache. The cached block of data associated with a first block of data in primary storage. In response to a host data access operation, a second block of data is accessed directly from the primary storage. The second block of data encompasses the first block of data. In response to determining at least one storage error affecting a portion of the second block of data, it is determined whether an associated portion is available in the cached block of data. In response to determining the associated portion is available, the associated portion of the cached block of data is used rather than the portion of the second block of data These and other features and aspects of various embodiments may be understood in view of the following detailed discussion and accompanying drawings

BRIEF DESCRIPTION OF THE DRAWINGS

In the following diagrams, the same reference numbers may be used to identify similar/same components in multiple figures.

DETAILED DESCRIPTION

In the following description of various example embodiments, reference is made to the accompanying drawings that form a part hereof, and in which is shown by way of illustration various example embodiments. It is to be understood that other embodiments may be utilized, as structural and operational changes may be made without departing from the scope of the claims appended hereto.

The present disclosure is generally related to data recovery in non-volatile data storage devices such as hard drives, hybrid drives, and solid state drives. In response to detecting an error or defect in a region of storage media, a portion of a volatile or non-volatile cache may accessed in place of the defective region for use in data access (e.g., in response to a host data operation) as well as being used in a recovery operation, such as if the error or defect is unrecoverable.

Figure 1:
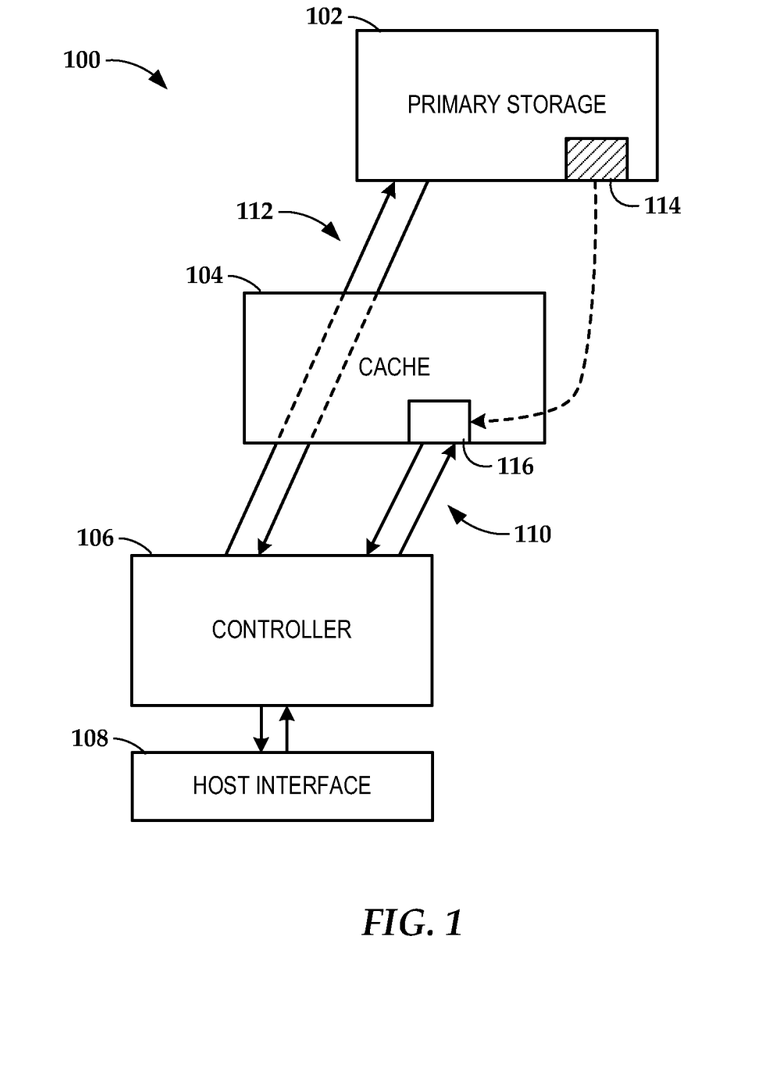
FIG. 1 is a block diagram illustrating a caching arrangement of a data storage device according to an example embodiment.

In reference now to FIG. 1, a block diagram illustrates a caching arrangement of a data storage device 100 according to an example embodiment. The data storage device 100 includes a primary storage 102 that provides the advertised amount of non-volatile storage for the device 100. The data storage device 100 also includes a cache 104 that improves throughput for data access operations from the primary storage 102 by a controller 106. The controller 106 may include any combination of an overall device controller or a specialized cache controller. The cache 104 may include any combination of volatile and non-volatile memory. A host interface 108 facilitates communications between the device 100 and a host device (not shown).

The primary storage 102 may utilize media such as magnetic disks or solid-state memory to store data. Generally this media may exhibit errors due to manufacturing defects, damage, wear, etc. The device 100 may utilize features such as error correction codes (ECC) and other techniques to attempt to recover from the error. In some cases it may not possible to recover from an error in the primary storage 102. In such a case, the device 100 may need to send an error message to the host via the host interface 108. This may allow the host to take appropriate actions, such as to inform the user, rely on higher level error recovery (e.g., shadow copies, RAID, backups). In this example, data from the cache 104 may be used as another resource to recover from such an error within the device 100, and thereby avoid reporting an error to the host.

Generally, the host performs data operations (e.g., reads and writes) via the host interface 108. The controller 106 may first attempt to perform the data operations through the cache 104, as represented by lines 110. If the data is unavailable in the cache 104 (e.g., a "cache miss"), the controller 106 can access the data directly from primary storage 102, as represented by lines 112. As part of the direct access operation 112, the controller 106 (or a specialized cache controller) may also place the requested data into the cache 104. This can speed up host access to the data, because later operations on the data can be performed in the relatively faster cache 104 instead of the relatively slower primary storage 102. The controller 106 may also ensure data in the primary storage 102 is synchronized with the cache 104, such as when data in the cache 104 is modified by a write request from the host interface 108.

In the illustrated example, the data storage device 100 may rely on the cache 104 as an alternate source of data to rely upon if unrecoverable error is detected in the primary storage 102. For example, if an attempt to access data block 114 exhibits an unrecoverable error, the data stored in block 114 may have been previously stored in the cache 104 at block 116. Normally, a storage device 100 may be configured to first access the cache block 116 instead of the primary storage block 114 in response to a host data access request. In such a case, the defect at block 114 may not be discovered until the block 116 is synchronized with block 114 (if needed) and/or an attempt is made to access block 114 after block 116 has been flushed from the cache. However, there are some scenarios in which the controller may access data from primary block 114 even when the data is available at block 116 in the cache 104.

One example where data may be read from primary storage block 114 even if the data is cached at block 116 involves the host requesting a "small" range of memory that includes location 114. In response to the request, the data from location 114 is cached in location 116 in accordance with a caching algorithm. At a later time, the host may request a larger block of data that encompasses location 114. In this case, the controller may determine that it is more efficient to retrieve the entire block of requested data from primary storage 102 rather than reading parts of it from the cache 104 (including data at block 116) and parts from primary storage 102. In another example, the controller 106 (or a separate cache controller) may be performing synchronization between cache 104 and primary storage 102 (e.g., in response to a background scan or triggered by the caching algorithm). In such a case, an error may be determined when trying to read and/or write to the location 114 in order to synchronize with location 116.

Generally, the controller 106 may be configured to determine an occurrence of at least one storage error in an addressable portion (e.g., data block 114) of the primary storage 102. The addressable portion 114 stores a block of data, which may include host data and/or data utilized internally by the storage device 100. In response to determining the occurrence of the storage error, the controller 106 determines whether the block of data is available in the cache 104, e.g., at block 116. In response to determining the block of data is cached, the cached block of data 116 is used rather than the block of data from the addressable portion 114 of the primary storage. The cached data 116 may be used to service a host data request, recover/relocate data at addressable portion 114 in main storage, etc.

In a conventional data storage arrangement, the cache 104 may be used primarily as a resource for increasing data throughput and responsiveness, and may not be used as a data recovery resource. However, because the cache 104 stores mirrored, redundant data, it may serve as a valuable source of backup data. Further, because this mirrored data is most recently used, it may be of the most value to the host/user. Use of cached data as a backup source may be useful in devices such as hybrid drives, which include a non-volatile cache 104 (e.g., flash memory) with storage capacity that is a significant fraction (e.g., 5-10%) of the capacity of the primary storage 102.

The large non-volatile cache of a hybrid drive reduces the need to directly access the primary storage (e.g., magnetic hard disc) to service host requests. This allows these drives to achieve data throughput similar to that of solid-state drives (SSDs) under some conditions, yet without the high costs per unit of storage associated with SSDs. Because a hybrid drive may have a large amount of data cached in non-volatile memory, there may also be a greater likelihood in finding redundant data in the cache 104 to resolve an unrecoverable error in the primary storage 102 than in a device with a smaller cache.

It will be appreciated that the concepts described herein need not apply only to hybrid drives. For example, an SSD may utilize a non-volatile cache that uses faster and/or more reliable memory than the main store. Also, both SSDs and conventional hard drives may utilize a volatile cache (e.g., DRAM) that can be used in the same way as is described herein regarding non-volatile cache memory. In yet another variation, data in the primary storage may be used to detect and correct an error in the cache.

Figure 2:
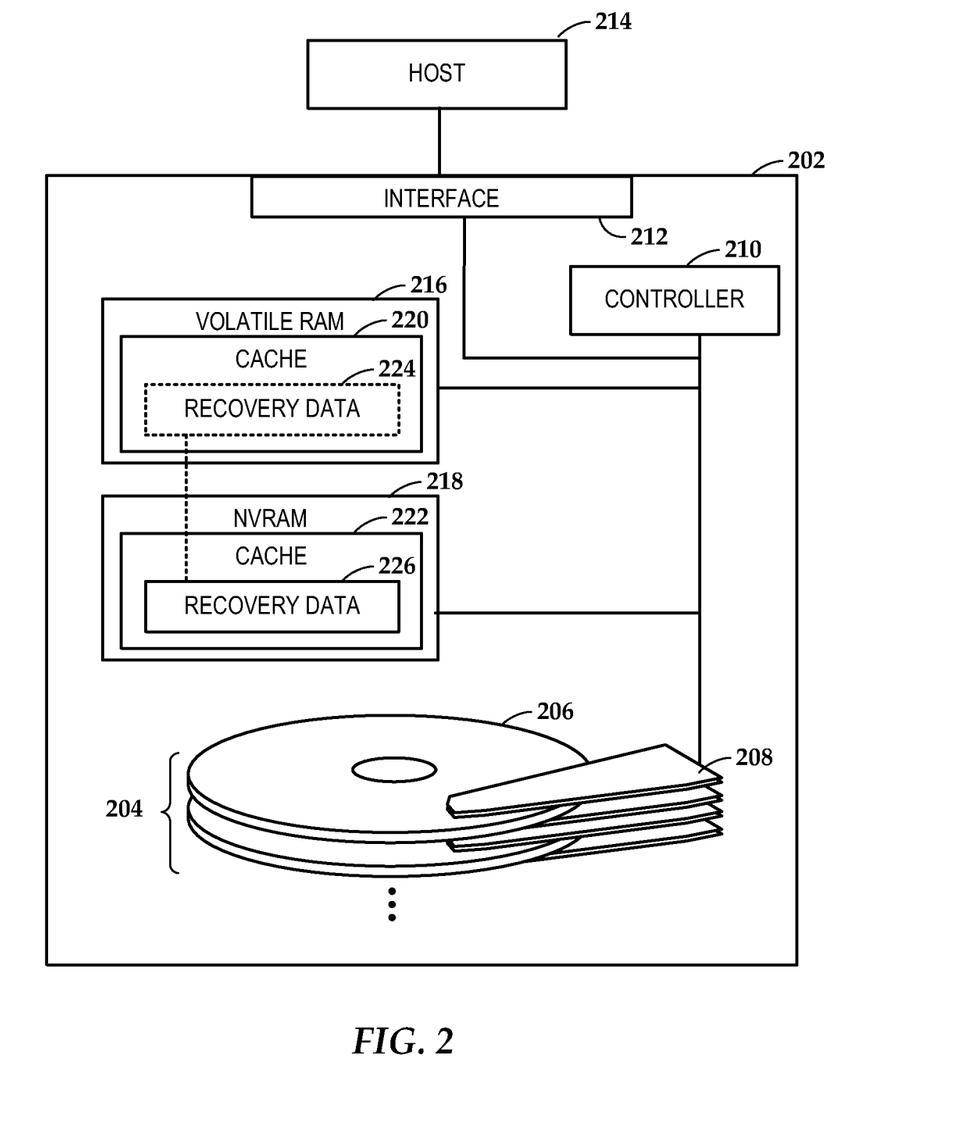
FIG. 2 is a block diagram of an apparatus according to an example embodiment.

A more detailed apparatus 202 according to an example embodiment shown in the block diagram FIG. 2. The apparatus 202 may be configured as a conventional or hybrid hard disk drive. The apparatus 202 includes primary storage media 204 that includes one or more magnetic disks 206. The disks 206 store data as magnetic patterns that are read by sensors (e.g., magnetic read/write heads) mounted on a pivoting arm assembly 208. A controller 210 is coupled to the arm assembly for both controlling movement of the arm via an actuator (not shown) and sending and receiving signals to one or more read/write heads on the arms. While this embodiment shows a rotating magnetic storage media 204, the concepts described below may also be applicable to alternate storage media, such as flash memory.

The apparatus 202 includes a host interface 212 that communicatively couples the apparatus 202 to a host 214. The host interface 212 at least provides a mechanism that allows the host 214 to store and retrieve information to/from the media 204. The host interface 212 may utilize standard communication interfaces and protocols, such as SATA, SCSI, eSATA, SAS, USB, etc. The host interface 212 provides a standard means of communication between the apparatus 202 and host 214, as well as abstracting operations of the controller 210 and media 206. For example, the host 214 may access data by way of logical block addresses (LBAs) that are mapped internally to a different physical addressing scheme, e.g., based on cylinders, heads, and sectors. The physical addressing scheme is used internally by the controller 210 for performing read and write operations requested by the host 214, which uses LBAs in the requests.

The controller 210 may utilize various internal adaptations of the apparatus 202 to improve performance or otherwise provide efficient operation with the host 214. For example, the apparatus 202 may include a volatile random-access memory (RAM) 216, such as dynamic-RAM (DRAM), and a non-volatile RAM (NVRAM) 218, such as NAND flash memory. These memory devices 216, 218 may have a number of different uses, such as acting as temporary and permanent stores for data needed by the controller 210 during operation. The memory devices 216, 218 may also be used for caching host data, as represented by respective caches 220, 222.

Data retrieved from media 204 or stored to media 204 can be held in one or more caches 220, 222 to improve throughput. The caches 220, 222 have faster access and retrieval times than the media 204, although generally with less storage capacity. While there is also some processing overhead in maintaining the one or more caches 220, 222, the faster media employed by the cache can improve the overall performance of the apparatus 202 under many conditions.

In the present embodiment, recovery data 226 is stored in the NVRAM cache 222. The recovery data 226 is stored in response to normal caching operations performed by the apparatus 202. In one configuration, this data 226 may be linked to an equivalent region 224 in volatile RAM 216. In this configuration, regions within volatile RAM 216 may be backed up by regions with equivalent sizes in the NVRAM 218. In such an arrangement, a power loss event may trigger data transfer (back-up) from volatile RAM 216 to NVRAM 218 powered by back electromagnetic force (EMF) from the still-spinning drive motor, batteries, capacitors, etc.

In the illustrated apparatus 202, when an error is encountered when accessing (e.g., reading and writing) the primary storage media 204, an attempt may be made to determined whether the block of data being accessed has been cached, e.g., cached recovery data 226. If so, the cached data 226 may be accessed instead, and the error flagged. This use of the cached data 226 may occur even if the error is recoverable, e.g., by refreshing the data on the media. In such a case, any determination of the type of error and performance of recovery options may be put off until a later time. In such a case, the associated region 226 in the cache 222 may be flagged so that this portion of the cache 222 is not flushed or otherwise affected by the caching algorithm.

Figure 3:
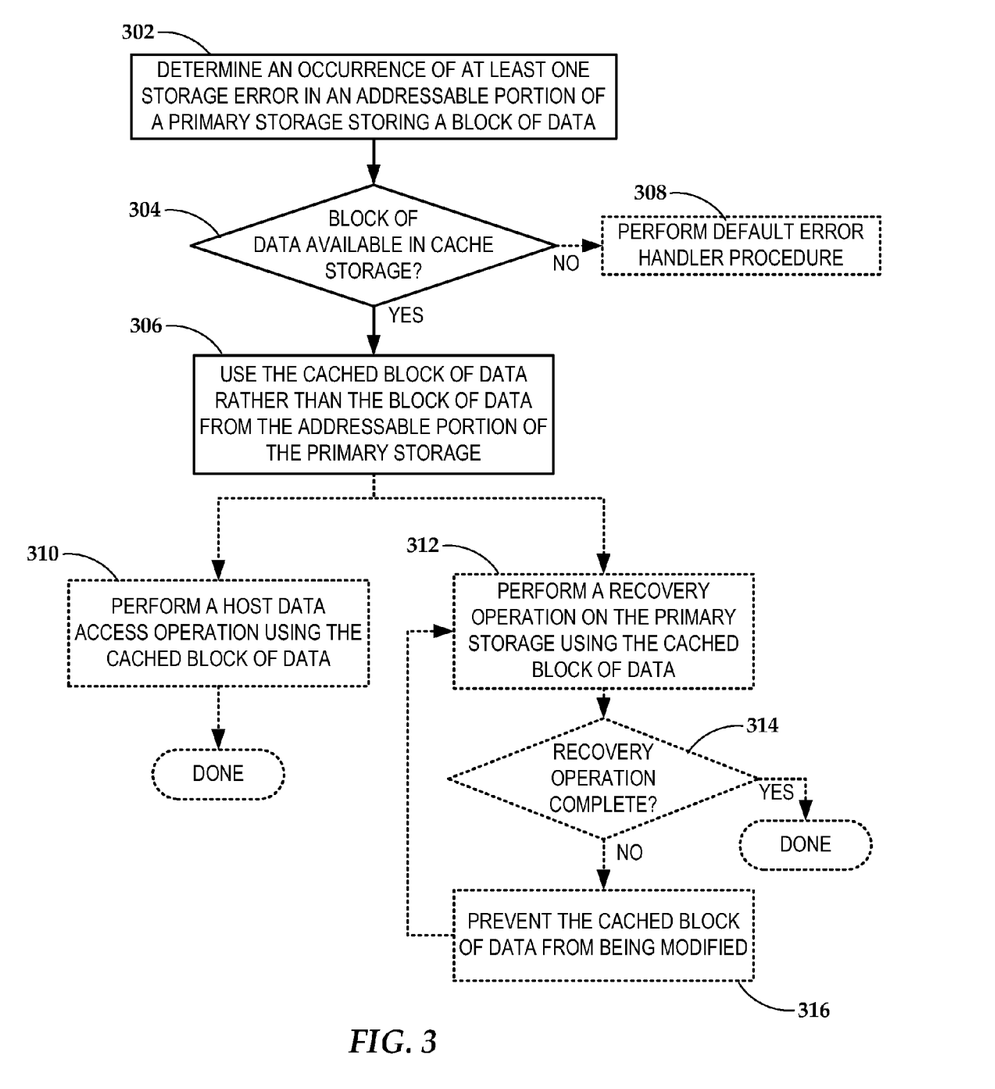
FIG. 3 is a flowchart of a procedure for data repair and/or reallocation with non-volatile cache journaling according to an example embodiment.

In reference now to FIG. 3, a flowchart illustrates a procedure according to an example embodiment. An occurrence of at least one storage error is determined 302 in an addressable portion of a primary storage storing a block of data. The addressable portion may include a sector, page, etc., of the primary storage and may be associated with a host LBA and/or a physical address. In response to determining 302 the occurrence of the at least one storage error, it is next determined 304 whether the block of data is available in cache storage, such as a primary DRAM cache and/or a secondary non-volatile, solid-state memory cache. This determination 304 may involve, for example, seeing if an access of the addressable portion via the cache results in a cache hit.

In response to determining 304 if the block of data is cached, the cached block of data is used 306 rather than the block of data from the addressable portion of the primary storage. If it is determined at 304 that the block of data is not included in cache storage, then a default error handler procedure 308 may be performed.

The use 306 of the cached block of data may include, among other things, performing 310 a host data access operation (e.g., read/write) using the cached data, and/or performing 312 a recovery operation on the primary storage. These operations 310, 312 may be performed separately or together. For example, the host access operation 310 may be performed immediately, and the block of data flagged (in the cache, primary storage, and/or elsewhere) for later performing the recovery operation 312. Or the recovery 312 may be performed independently of any host access 310, e.g., in response to a background scan.

The data recovery operation 312 may include a refresh/rewrite of the block of primary storage using data stored in the cache. If a refresh/rewrite does not succeed (e.g., rewritten block still exhibits read errors), then data in the affected block may be relocated elsewhere on the primary storage. Other data, such as blocks adjacent the affected block, may also be moved along with the affected block, e.g., to reduce fragmentation. The relocation of data blocks in such a case may involve allocation of space on a different portion of the primary storage media, writing data from the cache to the new location, and updating LBA-to-physical address mapping to reflect the physical address of the new data blocks. The defective blocks may then be marked to prevent further use.

A determination may be made at 314 as to whether the recovery operation 312 is complete. For example, the recovery operation 312 may have been started but was interrupted for some reason. Or, the need for the recovery operation 312 may have been flagged for later action as described above. If the operation is not complete, then an action 316 may be taken to prevent the cached block of data from being modified (e.g., moved, erased, etc.). This ensures that the data will not be lost, even if it might otherwise be moved out of the cache by the caching algorithm. After the recovery operation 312 is complete, the cached block of data may be left in the cache if it is still needed, removed immediately from the cache, and/or eventually flushed from the cache as part of the normal caching algorithm.

In the procedure shown in FIG. 3, the errors may be determined 302 based on host data access operations and/or based on operations performed internally by the data storage apparatus, e.g., not in response to any host actions. In one example, the system may utilize idle time of the data storage apparatus in order to do a background scan of the media. In one example, the apparatus may scan through the cache (e.g., primary DRAM cache and/or secondary non-volatile cache) and compare data in the cache with data stored in the primary storage. This scanning operation can determine whether any errors exist for blocks of the primary storage media that are currently cached, and therefore the errors can be quickly recovered from.

Figure 4:
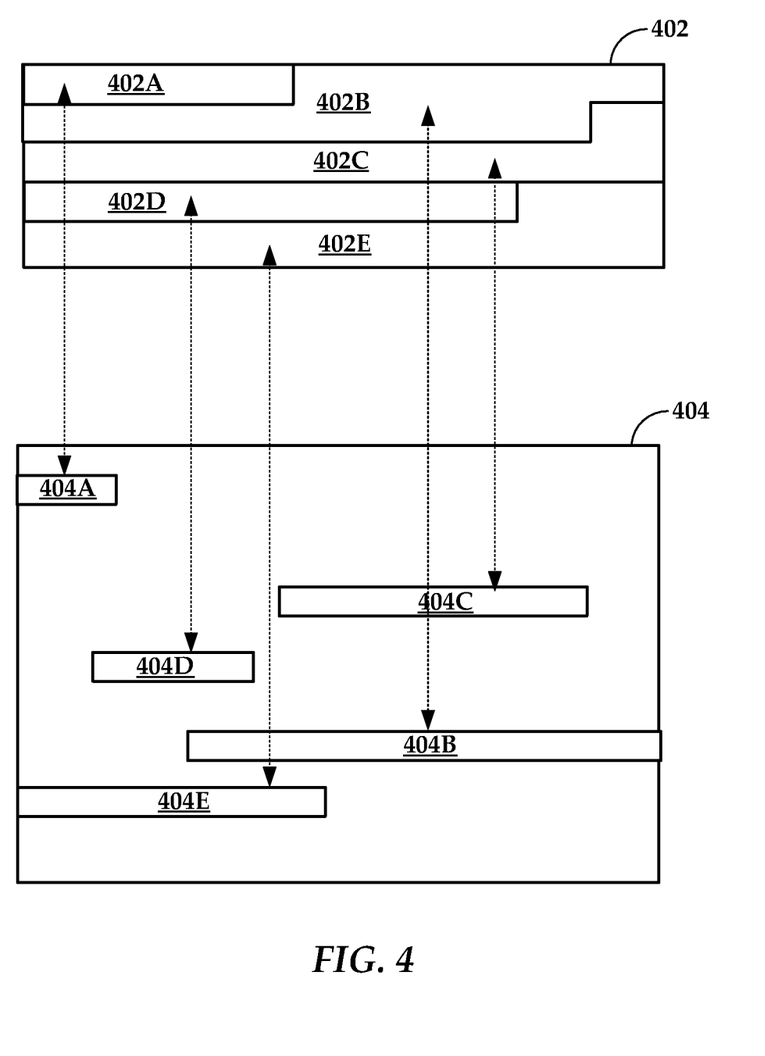
FIG. 4 is a block diagram of an arrangement of cache memory and primary memory according to an example embodiment.

In reference now to FIG. 4, a block diagram illustrates an arrangement of data in a storage device before performing a background scan according to an example embodiment. Block 402 represents a cache (primary, secondary, etc.) and block 404 represents a primary storage media of a data storage device. During normal operation of the device, requests for access (e.g., read, write) to the primary storage 404 may be processed from the primary storage, and the processed blocks then added to the cache to speed up subsequent accesses to the data. In this example, dashed lines indicate that representative regions 402A-E of the cache 402 being mapped to respective regions 404A-E of the primary storage 404. Depending on a caching algorithm used, when data is written to cached blocks 402A-E, the data 404A-E in primary storage 404 may be updated together (write-through cache). Alternatively, only the cache 402 may be updated immediately, and data blocks in the primary store 404 may be updated a later time (write-back cache).

For purposes of this discussion, it may be assumed that during idle time of the device, the data in the cache 402 is the synchronized with data in the primary storage 404. As a result, cache data blocks 402A-E are redundant to and mirror the respective blocks 404A-E in the primary storage 404. This allows the data 402A-E in the cache 402 to be conveniently used to verify the integrity of the blocks 404A-E stored in the primary storage 404 (and vice versa) during a background scan or similar processes.

Figure 5:
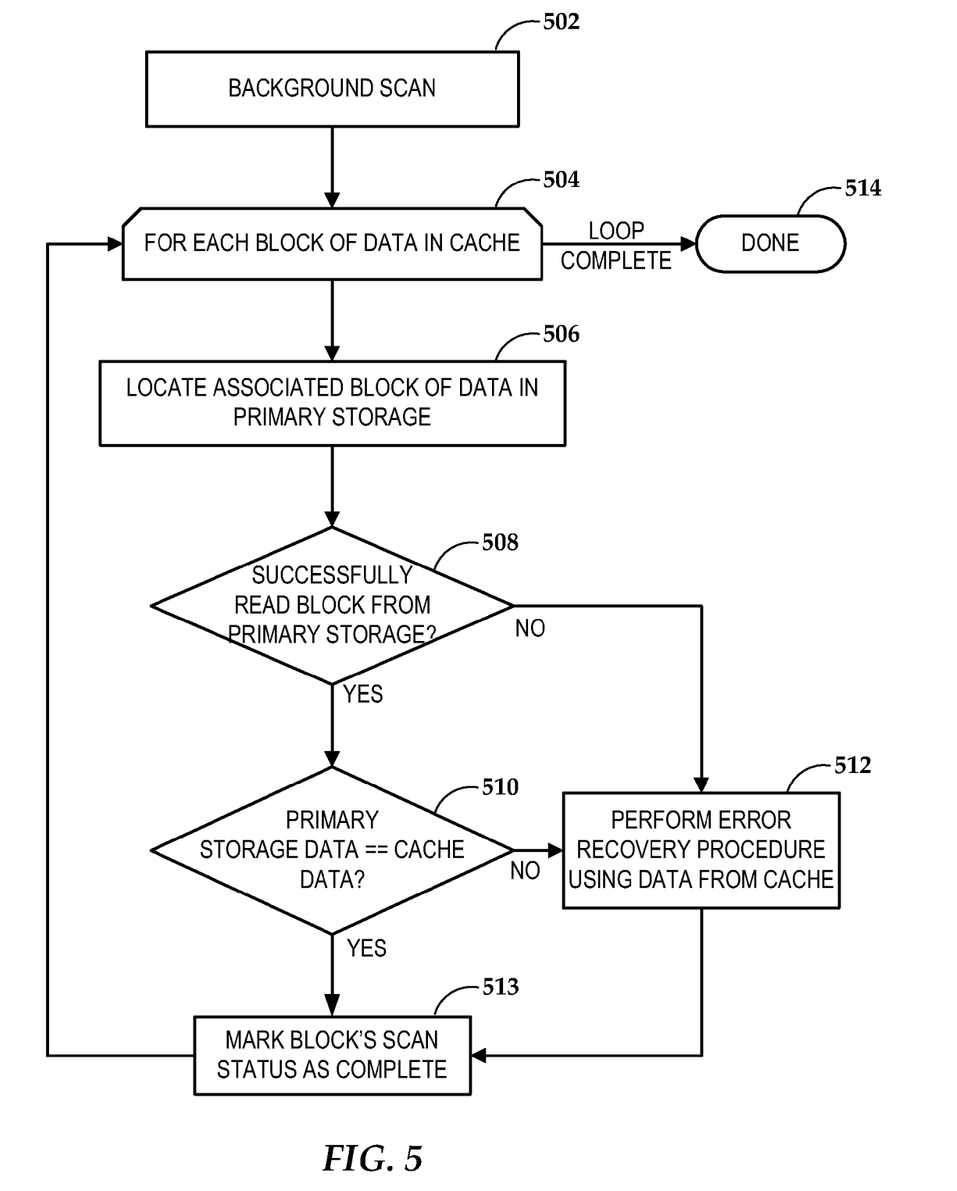
FIG. 5 is a flowchart of a procedure according to another example embodiment.

In reference now to FIG. 5, a flowchart illustrates a procedure for performing a background scan of a system according to an example embodiment. As shown in block 502 of FIG. 5, the procedure begins in response to a background scan for a system in a state such as illustrated in FIG. 4. It will be appreciated that this procedure may also be started in response to other events or operations, such as host-requested diagnostic procedures, cache algorithms, etc.

Block 504 represents entry into a loop that iterates through each block of data in the cache. The cache may include a primary cache and/or secondary cache, and the blocks iterated through at 504 may be the smallest addressable unit (e.g., sectors, pages, LBAs, physical addresses, etc.) or larger combinations thereof (e.g., contiguous or non-contiguous range of addresses). For each data block in the cache, an associated data block in primary storage is located 506. If the associated block is successfully read 508 from primary storage, then another test 510 determines whether the data in the primary storage is the same as the data in the cache. If it is determined that there is an error reading 508 or if the data in the cache is different the data primary storage 510, then an error recovery procedure is performed 512. This procedure 512 may include any procedure known in the art, including refreshing and/or relocating affected blocks of data in either the primary storage or cache. After all of the blocks cache have been iterated through, the procedure completes 514.

While the various embodiments described above have described using data stored in a cache to assist in recovery of primary storage, it will be appreciated this concept may be applicable to other uses and data storage arrangements. For example, for systems with two or more layers of cache, one layer of cache may be used to verify another layer of cache. In another arrangement, data from blocks of primary storage may be used to recover data in a cache. While the cache is generally considered to change more often than the primary storage, there may be situations where portions of a non-volatile cache may be used for long term storage (e.g., storing relatively static operating system boot files in non-volatile cache). In such a case, a background scan may discover degradation of cells of the cache, and use the primary storage to refresh or relocate blocks of data in the cache.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts shown herein can be used a guide to construct computer-readable code/instructions storable on a computer readable medium and executable by a processor to perform the operations shown in the flowcharts and described herein. The structures and procedures shown above are only a representative example of embodiments that can be used to facilitate managing error recovery in data storage devices as described above.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. A method comprising:
performing a background scan of a data storage device comprising, for each cached block of data in cache storage determining an occurrence of at least one storage error in an addressable portion of a primary storage storing a block of data associated with the cached block of data, the cached block of data having been stored in the cache storage before the occurrence of the at least one storage error, wherein the cache storage is arranged to mirror a portion of the primary storage to speed up host data access; and
in response to determining the occurrence of the at least one storage error, using the cached block of data to perform a recovery operation on the primary storage.

2. The method of claim 1, wherein the primary storage comprises a magnetic storage.

3. The method of claim 1, wherein the cache storage comprises a non-volatile, solid state memory.

4. The method of claim 1, wherein using the cached block of data further comprises using the cached block of data rather than the block of data from the addressable portion of the primary storage to perform a host data access operation.

5. The method of claim 1, wherein the recovery operation comprises moving the block of data to a new location on the primary storage.

6. The method of claim 1, further comprising preventing the cached block of data from being modified until the recovery operation can be performed.

7. The method of claim 1, wherein the at least one storage error comprises an unrecoverable error.

8. An apparatus comprising:
a controller capable of being coupled to a primary storage and a cache, wherein the cache is arranged to mirror a portion of the primary storage to speed up host data access, the controller configured to:
perform a background scan for each cached block of data in the cache, the background scan comprising determining an occurrence of at least one storage error in an addressable portion of the primary storage storing a block of data associated with the cached block of data, the block of data having been stored in the cache before the occurrence of the at least one storage error; and
in response to determining the occurrence of the at least one storage error, use the cached block of data to perform a recovery operation on the primary storage.

9. The apparatus of claim 8, wherein the primary storage comprises a magnetic storage.

10. The apparatus of claim 8, wherein the cache comprises a non-volatile, solid state memory.

11. The apparatus of claim 8, wherein using the cached block of data further comprises using the cached block of data rather than the block of data from the addressable portion of the primary storage to perform a host data access operation.

12. The apparatus of claim 8, wherein the recovery operation comprises moving the block of data to a new location on the primary storage.

13. The apparatus of claim 8, wherein the controller is further configured to prevent the cached block of data from being modified until the recovery operation can be performed.

14. The apparatus of claim 8, wherein the at least one storage error comprises an unrecoverable error.

15. The apparatus of claim 8, wherein the apparatus comprises a hybrid disk drive.

16. A method comprising:
causing a cached block of data to be stored in a cache in response to a first host data access operation, wherein the cache is arranged to mirror a portion of a primary storage to speed up the first host data access operation, the cached block of data associated with a first block of data in the primary storage;
in response to a second host data access operation after the first host data access operation, accessing a second block of data directly from the primary storage, wherein the second block of data encompasses the first block of data;
in response to determining at least one storage error affecting a portion of the second block of data, determining whether an associated portion is available in the cached block of data; and
in response to determining the associated portion is available, using the associated portion of the cached block of data rather than the portion of the second block of data.

17. The method of claim 16, wherein using the cached block of data comprises using the cached block of data to perform the second host data access operation.

18. The method of claim 16, wherein using the cached block of data comprises using the cached block of data to perform a recovery operation on the primary storage.

19. The method of claim 1, wherein the background scan occurs during an idle time of the data storage device.

20. The method of claim 3, wherein the background scan further comprises:
determining an error in at least one of the cached blocks of data; and in response thereto, use the block of data in the primary storage associated with the cached block of data to refresh or relocate the cached block of data.

21. The method of claim 1, wherein the cached block of data was stored in the cache storage in response to a host data access request before the occurrence of the at least one storage error.

* * * * *